United States Patent [19]
Paré et al.

[11] Patent Number: 5,327,851
[45] Date of Patent: Jul. 12, 1994

[54] ANIMAL SLEEPING BAG

[76] Inventors: Stephen F. Paré, 6 Skokorat St. Apt. #7, Seymour, Conn. 06483; Janice M. Paré, 49 Chapel St., Derby, Conn. 06418

[21] Appl. No.: 65,068

[22] Filed: May 24, 1993

[51] Int. Cl.⁵ ............................................. A01K 13/00
[52] U.S. Cl. .................................... 119/19; 119/28.5; 2/69.5; 383/902; 383/907
[58] Field of Search ................ 119/28.5, 45.1, 19; 2/69.5; 383/107, 117, 119, 902, 907

[56] References Cited

U.S. PATENT DOCUMENTS

| | | | |
|---|---|---|---|
| 529,690 | 11/1894 | Ackell et al. | 383/107 |
| 981,192 | 1/1911 | Hollingshead . | |
| 2,271,100 | 4/1942 | Worth et al. . | |
| 2,775,222 | 12/1956 | Kruck . | |
| 2,969,767 | 1/1961 | Bassett | 2/69.5 |
| 3,037,480 | 6/1962 | De Silva | 119/45.1 |
| 3,989,008 | 11/1976 | Neumann . | |
| 4,008,687 | 2/1977 | Keys . | |
| 4,169,428 | 10/1979 | Waugh . | |
| 4,457,261 | 7/1984 | Marshall . | |
| 4,543,911 | 10/1985 | Marshall . | |
| 4,729,343 | 3/1988 | Evans . | |
| 4,893,586 | 1/1990 | Carson . | |
| 4,959,881 | 10/1990 | Murray . | |
| 5,010,617 | 4/1991 | Nelson . | |
| 5,010,843 | 4/1991 | Henry . | |
| 5,092,682 | 3/1992 | Fenick | 383/117 |
| 5,172,427 | 12/1992 | Van Bergen . | |

*Primary Examiner*—Gene Mancene
*Assistant Examiner*—Todd E. Manahan
*Attorney, Agent, or Firm*—Richard C. Litman

[57] ABSTRACT

An animal sleeping bag well suited for small animals such as hamsters, guinea pigs, ferrets or the like, has a sleeping compartment and reinforced border attached to the opening end of the sleeping bag. The sleeping compartment is made of an opaque, air-permeable material, allowing the animal to safely burrow within. This lightweight, resilient material enables the animal to easily relocate its sleeping place and comfortably burrow during daylight hours within a cage.

8 Claims, 2 Drawing Sheets

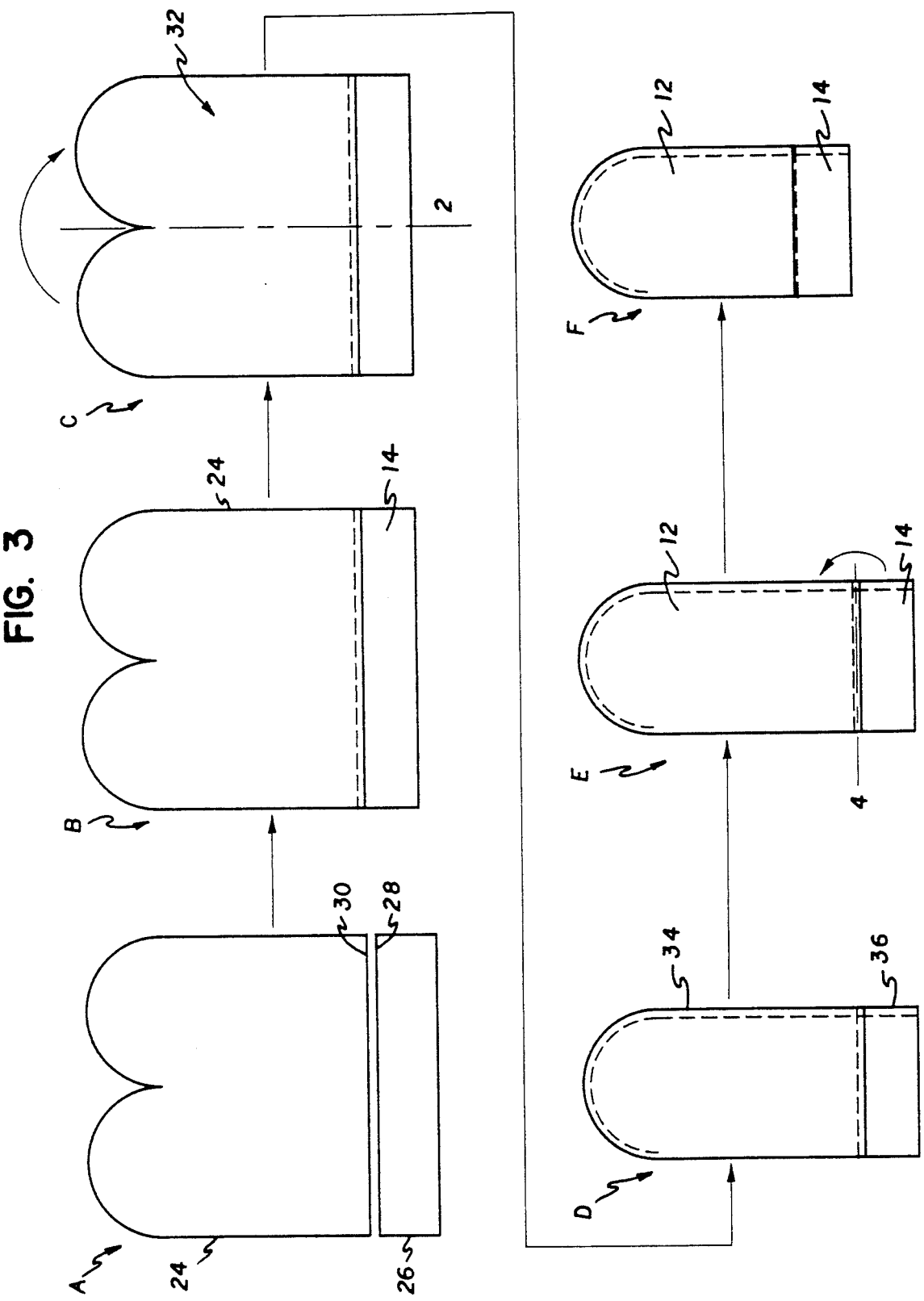

ANIMAL SLEEPING BAG

BACKGROUND OF THE INVENTION

1. Field of the Invention

The present invention relates to a sleeping bag adapted for use by hamsters, guinea pigs, ferrets, or other small animals, simulating a cave-like, sleeping compartment, enabling the animals to burrow and easily relocate their sleeping area within the cage.

2. Description of the Prior Art

A pet bed comprising a pair of semi-circular cushions connected along their circumferential perimeters to a circular cushion is seen in U.S. Pat. No. 5,010,843, issued to Beth Henry on Apr. 30, 1991. A pocket is formed between the adjacent surfaces of the semi-circular and circular cushions whereby a pet may crawl into the pocket to burrow and rest.

U.S. Pat. No's. 2,775,222, issued to Eugene Kruck on Dec. 25, 1956, and 4,893,586, issued to Betty J. Carson on Jan. 16, 1990, disclose animal sleeping bags including top and bottom members sewn about their perimeters, and having at least one access passage for the animal to enter and burrow within. U.S. Pat. No. 4,169,428, issued to Dorothy C. Waugh on Oct. 2, 1979 also discloses a sleeping bag having at least one access passage for the animal to enter, along with a plurality of small air apertures formed in the edge portions of at least the upper layer.

In addition, U.S. Pat. No's. 3,989,008, issued to Gerhard Neumann on Nov. 2, 1976 and 4,729,343, issued to Lydia Evans on Mar. 8, 1988, include sleeping quarters arranged in a housing comprising a bottom plate and having an opaque framework attached to each side defining one entrance opening for the animal. The framework provides a cave-like sleeping environment having a permanently opened entrance, allowing air circulation in and around the burrowing animal.

U.S. Pat. No. 4,008,687, issued to Francis Jackson Keys discusses an oversized slipper adapted to provide a sleeping nook for a house pet. The heel of the sole is provided with a fastener portion on the outer end, providing a more confined nook for the pet while having sufficient openings on either side of the slipper, enabling the animal to breathe and peer out.

Furthermore, U.S. Pat. No's. 981,192, issued to William R. Hollingshead on Jan. 10, 1911 and 4,959,881 issued to Ellen E. Murray on Oct. 2, 1990, discuss cleaning mitts comprising a plurality fabric layers secured together along the peripheral edge providing a hand compartment proportioned to accommodate the hand of a user. U.S. Pat. No's. 2,279,100, issued to Henry Worth et al. on Apr. 7, 1942, 5,010,617, issued to Walter Nelson on Apr. 30, 1991 and 5,172,427, issued to Peter J. Van Bergen on Dec. 22, 1992, each disclose a fingerless mitt having a plurality of fabric layers secured together along the peripheral edge, forming a hand-receiving pocket with wrist gripping means lightly engaging the wrist of the user.

U.S. Pat. No's. 4,457,261, issued to Tina Marshall on Jul. 3, 1984 and 4,563,911, issued to Tina Marshall on Oct. 1, 1985 discuss a mitten for canines comprised of a lightweight, waterproof, flexible latex material, whereby the top of the mitten has a self gripping material to secure the mitten to the canines foot.

None of the above inventions and patents, taken either singly or in combination, is seen to describe the instant invention as claimed.

SUMMARY OF THE INVENTION

The main object of this invention is to provide a sleeping bag of predetermined dimensions for hamsters, ferrets, guinea pigs or other small animals. The sleeping bag enables the animal to easily relocate its sleeping place and to comfortably burrow during daylight hours.

Sleeping quarters have contributed to the animal's security and well being by closely confining the animal's body with soft resilient padding. Conventional sleeping bags which have tried to provide this feature have been limited by the varying animal sizes, whereby a structure providing closeness for a large animal may be cavernous for a smaller animal. Further, the rigid and multipleply padded materials are cumbersome in construction, adding unnecessary weight and are inconvenient to handle when being transported. These heavier materials also limit the air circulation when the animal burrows itself deeply under the material to keep warm. However, permanently open entrances do provide air circulation within the sleeping quarters, although at the time of most use, daylight will shower upon the burrowing animal.

The present invention obviates these difficulties by providing a predetermined custom sized sleeping bag for each animal.

Preferably, a sleeping compartment is constructed from a porous, 100 percent cotton flannel material allowing air to freely permeate through and around the burrowing animal. The flannel material having an opaque quality allows minimal light penetration and permits the animals to comfortably burrow during daylight hours. A border attached to the proximal opening of the sleeping compartment, provides reinforcement and additional padding around the access passage. This lightweight, resilient material enables the animals to easily relocate their sleeping place and comfortably burrow within a cage.

Accordingly, it is a principal object of the invention to provide a sleeping bag having an uncomplicated method of construction and configuration.

It is another object of the invention to provide a sleeping bag enabling the animal to easily relocate its sleeping area within the cage.

It is a further object of the invention to provide a sleeping bag of an opaque material, creating a dark and secure sleeping environment.

Still another object of the invention is to provide a sleeping bag constructed from resilient and durable material It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a schematic view illustrating the method of construction of the invention.

Similar reference characters denote corresponding features consistently throughout the attached drawings.

DETAILED DESCRIPTION OF THE PREFERRED EMBODIMENTS

Figure 1:
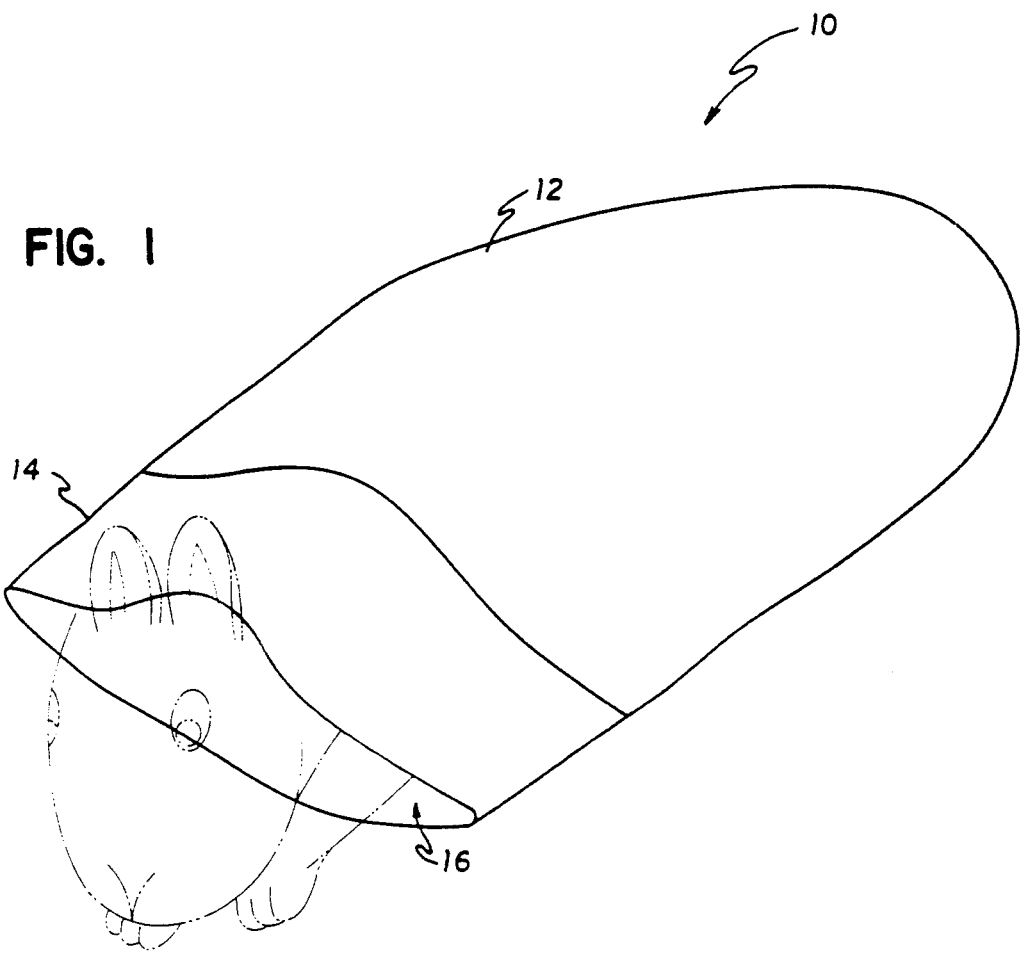
FIG. 1 is an environmental perspective view of the invention.

The present invention, seen in FIG. 1, provides an animal sleeping bag 10 which features a sleeping compartment 12 and a border 14, reinforcing proximate opening 16 of sleeping bag 10.

Figure 2:
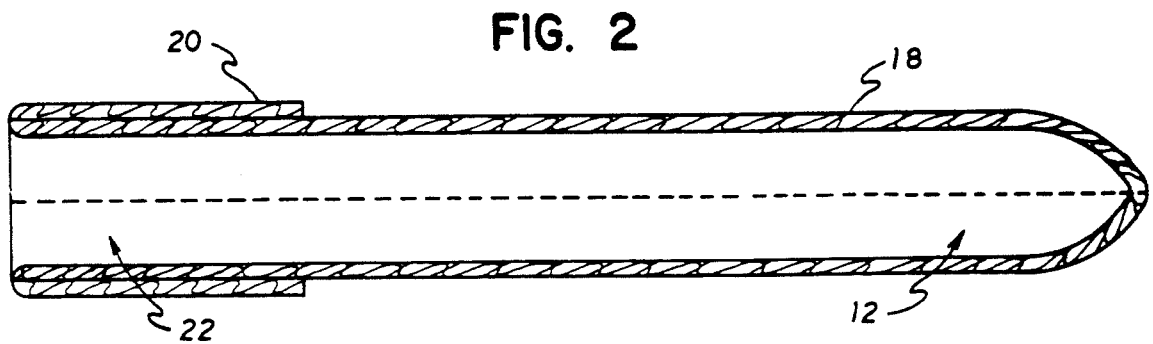
FIG. 2 is a sectioned view taken along a longitudinal centerline of the invention.

Sleeping bag 10 is seen in greater detail in FIG. 2. Preferably, sleeping compartment 12 is made of a porous, 100 percent cotton, flannel material 18, allowing air to freely permeate through and into sleeping compartment 12, and having an opaque quality, enticing in the comfortable, darker confines of compartment 12. The border 14, defining an entry opening 16, is of a polyester/cotton blend construction for added padding around access passage 22.

A method of construction, shown in FIG. 3, including steps A,B,C,D,E, and F provides a first step A, which is cutting an "M"-shaped, integral pattern 24, and a rectangular shaped band 26 which will form border 14. A first longitudinal side 28 of border 14 is stitched to the horizontal edge 30 of "M"-shaped pattern 24, as shown in step B. In step C, symmetrical shape 32 is folded along a central, bisecting axis 2, forming a layer integral along one edge. The folded symmetrical shape 32 is sewn along the periphery 34 and distal ends 36 of border 14, illustrated in step D. Border 14 is folded about horizontal axis 4 in step E and is stitched around sleeping compartment 12 securing border 14 thereto. The reason for stitching or sewing the folded border 14 back onto sleeping compartment is to prevent the animal from attempting to burrow into the space between the border and the sleeping compartment. Thus, encouraging the animal to enter the bag through opening 16.

Suggested dimensions depending on the animal are as follows. A suitable sized sleeping bag for a hamster is about $4 \times 6\frac{1}{2}''$. For a larger size animal, such as a guinea pig, a sleeping bag having overall dimensions of about $6 \times 9''$ is appropriate. Larger sized animals, such as ferrets, will be comfortable in a sleeping bag which is approximately $9\frac{1}{2} \times 14''$ in size.

It is to be understood that the present invention is not limited to the sole embodiment described above, but encompasses any and all embodiments within the scope of the following claims.

We claim:

1. An animal sleeping bag comprising:
    a body section defining a sleeping compartment of predetermined dimensions to comfortably accommodate an animal, said body section having an open end to provide an access passage into said sleeping compartment; and
    a border section defining a continuous border attached along said open end of said body section and reinforcing said access passage, said border section being made of a polyester/cotton material for extra padding around said access passage.

2. The animal sleeping bag according to claim 1, wherein said body section is a porous material, allowing air to freely permeate said sleeping compartment.

3. The animal sleeping bag according to claim 1, wherein said body section is a durable, resilient material.

4. A method for making an animal sleeping bag comprising the steps of:
    cutting a first piece of fabric forming a "M"-shaped, integrally attached pattern of a sleeping bag;
    cutting a second piece of fabric in a rectangular shaped band forming a border reinforcing a proximate opening of the sleeping bag;
    sewing a first longitudinal side of said border to horizontal edge of said integrally attached pattern forming one symmetrical sleeping bag figure;
    folding the figure along a central, bisecting longitudinal axis forming a symmetrical layer integral along one edge;
    sewing about the periphery of said symmetrical layer and distal ends of said rectangular border forming a compartment having said opening proximate said border;
    folding the border along horizontal stitching and around the compartment defining said proximate opening; and
    sewing a second side of the border to the compartment securing said border thereto.

5. The method for making an animal sleeping bag according to claim 4, wherein the completed sleeping bag is of a predetermined size for a hamster, and measures $4 \times 6\frac{1}{2}$ inches.

6. The method for making an animal sleeping bag according to claim 4, wherein the completed sleeping bag is of a predetermined size for a guinea pig and measures $6 \times 9$ inches.

7. The method for making an animal sleeping bag according to claim 4, wherein the completed sleeping bag is of a predetermined size for a ferret and measures $9\frac{1}{2} \times 14$ inches.

8. An animal sleeping bag comprising:
    a body section defining a sleeping compartment of predetermined dimensions to comfortably accommodate an animal, said body section having an open end to provide an access passage into said sleeping compartment, said body section being made of a 100 percent, cotton flannel material, having an opaque quality allowing minimal light penetration; and
    a border section defining a continuous border attached along said open end of said body section and reinforcing said access passage.

* * * * *